(12) United States Patent
Hosomizo

(10) Patent No.: US 11,609,727 B2
(45) Date of Patent: *Mar. 21, 2023

(54) NON-TRANSITORY COMPUTER-READABLE RECORDING MEDIUM, INFORMATION PROCESSING APPARATUS AND PRINTING METHOD

(71) Applicant: BROTHER KOGYO KABUSHIKI KAISHA, Nagoya (JP)

(72) Inventor: Yoshito Hosomizo, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/219,966

(22) Filed: Apr. 1, 2021

(65) Prior Publication Data

US 2021/0216258 A1 Jul. 15, 2021

Related U.S. Application Data

(63) Continuation of application No. 16/795,737, filed on Feb. 20, 2020, now Pat. No. 10,970,013.

(30) Foreign Application Priority Data

Mar. 28, 2019 (JP) .............................. JP2019-064939

(51) Int. Cl.
*G06F 3/12* (2006.01)
*G06K 15/02* (2006.01)

(52) U.S. Cl.
CPC .......... *G06F 3/1228* (2013.01); *G06F 3/1208* (2013.01); *G06K 15/1897* (2013.01)

(58) Field of Classification Search
CPC .. G06F 3/1228; G06F 3/1208; G06K 15/1897
(Continued)

(56) References Cited

U.S. PATENT DOCUMENTS

2012/0307293 A1 12/2012 Natori
2017/0223210 A1 8/2017 Kamada
(Continued)

FOREIGN PATENT DOCUMENTS

JP 2017-068304 A 4/2017
JP 2017-134718 A 8/2017
(Continued)

OTHER PUBLICATIONS

International Search Report and Written Opinion of the International Searching Authority issued in the PCT application No. PCT/JP2020/006092 dated Mar. 31, 2020 together with English translations.
(Continued)

*Primary Examiner* — Quang N Vo
(74) *Attorney, Agent, or Firm* — Scully Scott Murphy and Presser

(57) ABSTRACT

When a general-use printing program receives a print instruction to cause a printer to execute printing of an image, a supporting program receives a print parameter used for processing intermediate image data. When the print parameter includes a setting of image combining of combining a watermark with an image subjected to printing in accordance with the print instruction, the supporting program causes a PC to generate a watermark to be combined with the image subjected to printing.

12 Claims, 6 Drawing Sheets

(58) Field of Classification Search
USPC ....... 358/1.15, 1.9, 501, 504, 537, 538, 540, 358/401, 448, 450, 452, 453
See application file for complete search history.

(56) References Cited

U.S. PATENT DOCUMENTS

| | | | |
|---|---|---|---|
| 2018/0077305 A1* | 3/2018 | Nishio | H04N 1/00962 |
| 2018/0373468 A1 | 12/2018 | Saigusa | |
| 2019/0007582 A1* | 1/2019 | Nagasaka | H04N 1/00676 |
| 2019/0303076 A1* | 10/2019 | Kato | G06F 3/1253 |
| 2020/0042260 A1 | 2/2020 | Kanamoto et al. | |

FOREIGN PATENT DOCUMENTS

| | | |
|---|---|---|
| JP | 2018-049579 A | 3/2018 |
| JP | 2019-008546 A | 1/2019 |
| JP | 2019-012952 A | 1/2019 |
| JP | 2019-175330 A | 10/2019 |

OTHER PUBLICATIONS

Notice of Allowance dated Oct. 6, 2020 from parent U.S. Appl. No. 16/795,737.
Notice of Allowance dated Dec. 10, 2020 from parent U.S. Appl. No. 16/795,737.
Notice of Allowance dated Oct. 2, 2020 from parent U.S. Appl. No. 16/795,737.
Notice of Reasons for Refusal dated Dec. 6, 2022 received in Japanese Patent Application No. JP 2019-064939.

* cited by examiner

NON-TRANSITORY COMPUTER-READABLE RECORDING MEDIUM, INFORMATION PROCESSING APPARATUS AND PRINTING METHOD

CROSS-REFERENCE TO RELATED APPLICATIONS

This application is a continuation application of U.S. Ser. No. 16/795,737 filed on Feb. 20, 2020 and claims priority under 35 U.S.C. § 119 from Japanese Patent Application No. 2019-064939 filed on Mar. 28, 2019. The entire subject matter of each of the applications is incorporated herein by reference.

BACKGROUND

The technical field disclosed in the present specification relates to a non-transitory computer-readable recording medium containing instructions realizing a supporting program which supports control of a printer, an information processing apparatus and a printing method.

RELATED ART

There has been widely known a technique to control a printer from an information processing apparatus such as a personal computer, a configuration of installing a printer driver in the information processing apparatus, generating print data using the printer driver and transmitting the print data to the printer. The printer driver is provided by a manufacturer of the printer and is adapted to various functions the printer has, and thus can make full use of the printer.

SUMMARY

Recently, a technique of controlling a printer using a general-use printing program which is standardly implemented in an operating system (OS), without using the above-mentioned printer driver, has been in practical use. According to such a technique, upon detecting a printer, the OS associates the printer with the OS-standard general-use printing program. Thereafter, it becomes possible that, when the OS receives a print instruction corresponding to the printer, printing is executed using the OS-standard general-use printing program, without using the printer driver.

However, in the printing using the OS-standard general-use printing program, selectable setting items when selecting print parameters are general items that are registered in the OS-standard general-use printing program. Therefore, the printing using the general-use printing program is inconvenient for the user as the general-use printing program does not support setting items that are intrinsic to the printer or the printer driver and thus there is room for improvement.

The present specification discloses a technique for realizing image combining of combining a specific object with an image subjected to be printed designated by the print instruction in an information processing apparatus to which an OS-standard general-use printing program is implemented.

According to aspects of the present disclosure, there is provided a non-transitory computer-readable recording medium for an information processing apparatus, the information processing apparatus having a controller, the recording medium containing computer-executable programs realizing a supporting program corresponding to a printer connectable to the information processing apparatus. The supporting program causes, when executed by the controller, the information processing apparatus to perform a receiving process when a print instruction is input to a general-use printing program, the print instruction causing the printer to execute printing of an image, the general-use printing program being a program implemented in an operating system of the information processing apparatus, the receiving process being a process of receiving a print parameter of printing corresponding to the print instruction, the print parameter including a setting of image combining, the image combining being a process of combining a specific object with a target image, the target image being an image subjected to printing based on the print instruction, and a generating process of generating specific data to be combined with generated data, the generated data being generated by the general-use printing program based on the target image, the target image being an image subjected to printing when the setting of the image combining is received in the receiving process.

BRIEF DESCRIPTION OF THE ACCOMPANYING DRAWINGS

DETAILED DESCRIPTION OF THE EMBODIMENT

First Embodiment

Hereinafter, referring to the accompanying drawings, a print system using programs according to the embodiment will be described in detail. The present embodiment shows a concrete example of the print system including a personal computer (hereinafter, referred to as a "PC") and a printer.

Figure 1:
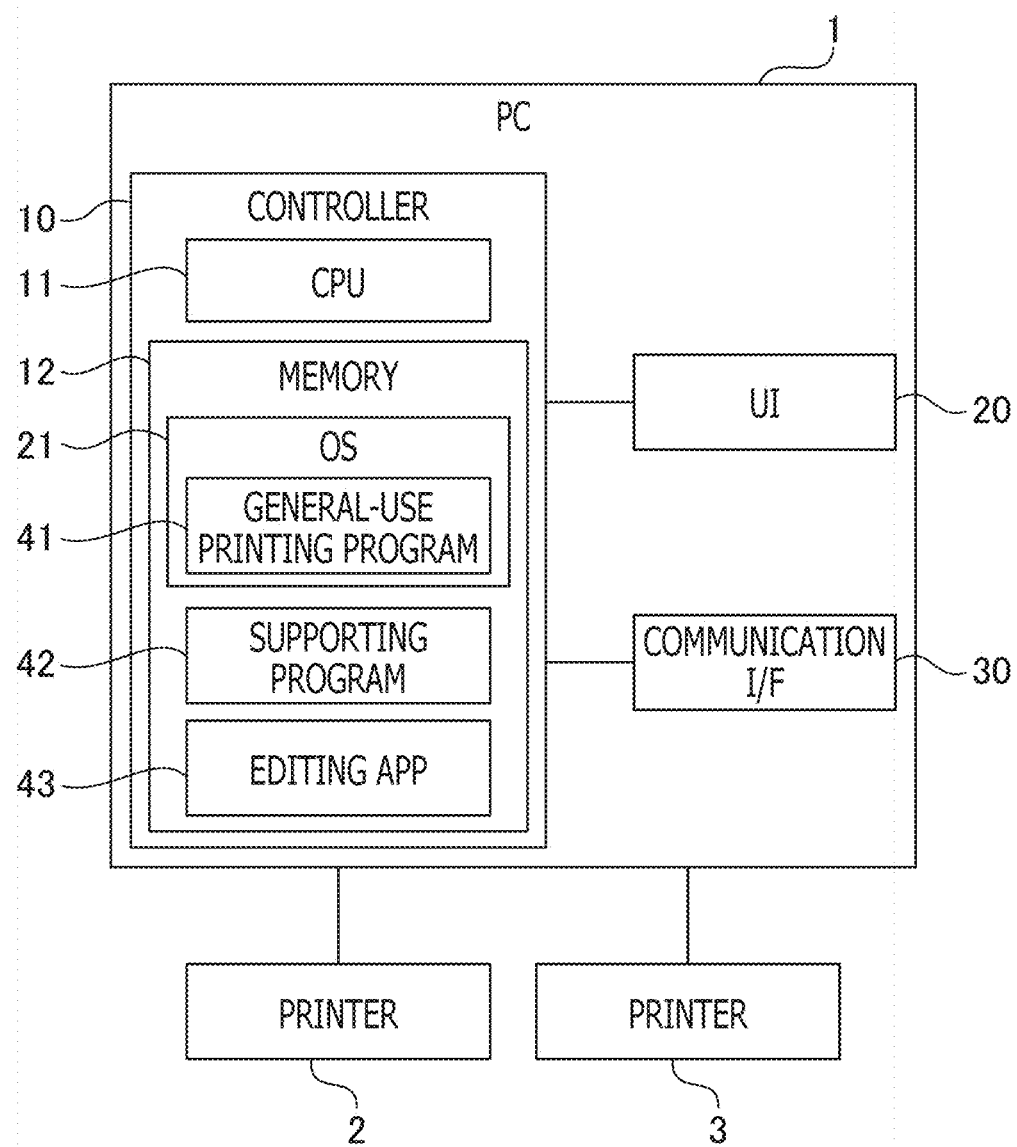
FIG. 1 is a block diagram showing an electrical configuration of a print system of the first embodiment.

An example of a configuration of a print system in which programs according to the embodiment are executed is shown in FIG. 1. The system shown in FIG. 1 includes a PC 1, a printer 2 and a printer 3. The PC 1 is an example of an information processing apparatus. The printer 2 and the printer 3 are devices having a printing function and are configured to communicate with the PC 1 through a local communication or a network communication. It is noted that a plurality of printers 2 may be connected to the PC 1.

As shown in FIG. 1, the PC 1 includes a controller 10, a user interface (hereinafter, referred to as a "UI") 20 and a communication interface (hereinafter, referred to as a "communication I/F") 30. The UI 20 and the communication I/F 30 are electrically connected to the controller 10.

The UI 20 includes hardware configured to display various pieces of information and receive user's input of instructions. The UI 20 may include a touch panel having both an input receiving function and a displaying function, or a combination of a display having a displaying function and a keyboard and/or a mouse having an input receiving function.

The communication I/F 30 includes hardware configured to communicate with the printer 2 and a hardware configured to access the Internet. The communication I/F 30 may include multiple interfaces respectively employing different communication methods. Examples of the communication methods may include the network communication, a USB communication and the like. Further, the communication methods may be wired or wireless.

The controller 10 includes a CPU 11 and a memory 12. The CPU 11 is an example of a computer. The memory 12 includes a ROM, a RAM, a non-volatile memory and a buffer of the CPU 11, and stores various application programs (hereinafter, referred to as "APP's") and various pieces of data. According to the present specification, details of the memories could be ignored and any memory having a suitable function could be employed as the memory 12. The CPU 11 executes various processes in accordance with programs retrieved from the memory 12 or in accordance with user's instructions. It is noted that the controller 10 in FIG. 1 is a collective name including hardware and software used to control the PC 1 and does not necessarily represent a single piece of hardware.

An example of the memory 12 may be a computer-readable storage medium. The computer-readable storage medium is a non-transitory medium. Examples of the non-transitory medium are, besides the above-described memory 12, recording mediums such as a CD-ROM, a DVD-ROM and the like. It is noted that the non-transitory medium is also a tangible medium. In contrast, an electric signal carrying a program, which is being downloaded from a server on the Internet, is a signal medium which is a kind of computer-readable media, but not included in the non-transitory computer-readable medium.

The memory 12 stores, as shown in FIG. 1, the OS 21 implemented with a general-use printing program 41, a supporting program 42 and an editing APP 43. The supporting program 42 is an example of a supporting program. The supporting program 42 is, for example, a hardware support APP (abbreviated as HSA) of which specification is published by Microsoft Corporation. The OS 21 is, for example, Microsoft Windows®, MacOS® or Linux®. It is noted that, in the memory 12, in addition to the data/APP shown in FIG. 1, various pieces of data including information regarding connected device, various programs of browser and the like are stored.

The general-use printing program 41 is an APP to cause various printers such as the printer 2 to execute printing from the PC 1 and is an OS-standard printing program which is implemented in the OS 21 in advance. The general-use printing program 41 according to the present embodiment is configured to generate print data the printer can use for printing based on image data subjected to be printed.

The general-use printing program 41 is a general-purpose APP which can be used for any of a plurality of models of printers supplied by various printer venders. The general-use printing program 41 is configured to cause any of the plurality of models of printers to perform operations which are commonly implemented in the plurality of models of printers. Alternatively, the general-use printing program 41 may be a program supplied from the printer venders to a vender of the OS 21 (e.g., the program may be a kind of printer driver, which is supplied by a printer vender, to be implemented in the OS 21 in advance) so that the general-use printing program 41 is implemented in the OS 21 in advance.

The supporting program 42 is a program which executes processes based on the instruction by the OS 21 in association with the startup of the general-use printing program 41 and an APP which supports controlling of hardware, such as the printer 2, subjected to the instruction. The supporting program 42 is started, for example, by the general-use printing program 41. The supporting program 42 is a program that is prepared by printer venders, such as a vender of the printer 2, for each type of printers. For example, a supporting program 42 for inkjet printers and a supporting program 42 for laser printers are prepared. The supporting program 42 may be prepared not only for each type of printers but also for each model or for each model series of printers.

The vender of the printer registers the supporting program 42 with a platform supplied by the vender of the OS 21 in accordance with a procedure designated by the vender of the OS 21. When a printer 2 is newly connected to the PC 1 and the supporting program 42 corresponding to the printer 2 is registered with the platform, the OS 21 downloads the supporting program 42 from a sever in which the supporting program 42 is stored and implements the same in the PC 1.

Then, the OS 21 associates identification information of the implemented supporting program 42 with the printer information of the newly connected printer 2 and stores the same in the memory 12. In the PC 1 to which a plurality of models of printers are connected, a plurality of supporting programs respectively corresponding to a plurality of types of the plurality of models are implemented in the OS 21, and information associating the plurality of printers with the plurality of supporting programs is stored in the memory 12. That is, in the memory 12, as the printer information for each of the printers connected to the PC 1, information on the supporting program 42 corresponding to each printer is stored in addition to the model information and the access information of each printer.

The editing APP is, for example, an APP for generating and/or editing image data and document data. Examples of the editing APP 43 are Microsoft Word® and Power Point®. Further, the editing APP 43 may be an APP provided by the vender of the printer 2 and/or printer 3. The editing APP 43 is configured to receive a user operation including an instruction to cause the printer 2 to perform a particular operation. Specifically, for example, the editing APP 43 is configured to receive, through the UI 20, a selection of an image subjected to printing, settings of the print parameters, and a print instruction which causes the printer 2 to execute printing. The image subjected to printing is an example of a target image.

It is noted that processes and process steps of each sequential chart described below basically indicate processes of the CPU 11 in accordance with instructions described in respective programs such as the supporting program 42. That is, in the following description of the processes and steps, terms "determine," "extract," "select," "calculate," "identify," "obtain," "receive," "control" and the like are those performed by the CPU 11. It is noted that the processes by the CPU 11 include controlling of hardware using an API of the OS 21. In the following description, operations of the programs will be described with omitting the detailed description of the OS 21. That is, in the following description, a description "a program B controls hardware C" may be interpreted to "a program B uses the API of the OS 21 to control the hardware C." Further, a process of the CPU 11 in accordance with the instruction described in a program may be described in a simplified manner. For example, the name of the program is omitted and simply described such that "the CPU 11 performs." Further, a process of the CPU 11 in accordance with an instruction described in the program may be described in a simplified manner such that "the program A performs" with omitting the term "CPU."

It is noted that the term "obtain" is used to mean that a request is not necessarily be made. That is, a process of the CPU 11 to receive data without any request is included within a concept that "the CPU 11 obtains data." Further, the term "data" in the present specification is used to mean a bit array readable by a computer. Multiple pieces of data having different formats but substantially the same contents will be treated as the same data. So is the information in the present specification. It is noted that terms "request" and "instruct" represent concepts of outputting information indicating something is requested and information indicating something is instructed, respectively. It is also noted that information representing something is requested or something is instructed may be simply referred to by terms "request" or "instruct."

Further, a process of the CPU 11 to determine whether or not information A indicates an event B may be described conceptually such that "the CPU 11 determines whether event B or not based on information A." Furthermore, a process of the CPU 11 to determine whether information indicates event B or event C may be described conceptually such that "the CPU 11 determines whether event B or event C based on information A."

Next, a configuration of the supporting program 42 of the present embodiment and an example of a printing procedure, including operations of the supporting program 42, will be described with reference to a sequential chart shown in FIG. 2. The supporting program 42 is a program which is instructed to be executed by the general-use printing program 41 when a print instruction instructing to execute printing using the general-use printing program 41 is received through the editing APP 43 in a state where a printer corresponding to the supporting program 42 is designated. In the following description, a case where the PC 1 received an instruction through the UI 20 (e.g., by the editing APP 43) to execute printing with the printer 2 using the general-use printing program 41 in a state where image data subjected to be printed is designated and the supporting program 42 corresponding to a type of a model of the printer 2 is implemented in the PC 1 will be described.

Firstly, the editing APP 43 receives, through the UI 20, designation of an image subjected to be printed and an instruction to execute printing (arrow A). An image that the editing APP 43 displays is an example of an image subjected to be printed. The editing APP 43 displays, for example, documents edited with the editing APP 43 and pictures and the like read with the editing APP 43 as images. For example, the editing APP 43 displays a print setting screen in a state where an image is displayed and receives settings of the print parameters. Then, upon receiving the print instruction, the editing APP 43 delivers a print execution notification indicating contents of the received print instruction to the OS 21. It is noted that, in FIG. 2, operations of the OS 21 are omitted.

When the print execution notification indicating usage of the general-use printing program 41 is received, the OS 21 executes the general-use printing program 41 and delivers the print execution notification to the general-use printing program 41 (arrow B). The general-use printing program 41 can obtain, through the print execution notification, various pieces of information included in the print instruction such as information indicating a printer to be caused to execute printing, information indicating print parameters being set with the APP, information indicating image data subjected to be printed and information for identifying a user who instructed to execute printing. It is noted that, as will be described later, these pieces of information can be used in the supporting program 42 as well.

The general-use printing program 41 generates the intermediate image data by converting a format of the image data included in the print execution notification to a format of the intermediate image data and generates a print job including the intermediate image data (arrow C). There are various types of image data as the image data included in the editing APP 43, and the general-use printing program 41 converts received image data to an intermediate image data suitable for the generation of the print data. It is noted that, if the image data included in the print execution notification is suitable for generating the print data, the generating of the intermediate image data may be omitted and the image data may be directly used as the intermediate image data. The intermediate image data is, for example, XPS format data.

The general-use printing program 41 further identifies a printer designated as a device to be caused to execute printing based on the information included in the print execution notification. For example, when the printer 2 is designated as the device to be caused to execute printing, the general-use printing program 41 identifies the model of the printer 2 based on the model information of the printer included in the printer information stored in the memory 12. Then, since the supporting program 42 corresponding to the printer 2 designated by the print instruction is stored in the memory 12, the general-use printing program 41 activates the supporting program 42 by outputting an execution command to cause the supporting program 42 to execute processes (arrow D).

Upon obtaining the intermediate image data by receiving the execution command (arrow D), the supporting program 42 causes the UI 20 to display a print parameter editing screen for receiving settings of the print parameters and receives the settings of the print parameters (arrow E). The process at the arrow E is an example of a receiving process.

The print parameters include general-use parameters to which the general-use printing program 41 is adapted and specific parameters to which the general-use printing program 41 is not adapted. The general-use parameters are, for example, parameters for setting the sheet size and the color/monochromatic printing. The specific parameters are, for example, intrinsic parameters intrinsic to the printer. The intrinsic parameters are, for example, parameters for setting a watermark. The watermark is an image to be printed while being combined with an image subjected to be printed in a predetermined density and, for example, a transparent image. The watermark is, for example, an image to be combined for preventing information leakage (e.g., a logo indicating that confidential information is included) or a character string such as "COPY". The density of the watermark may be changeable arbitrarily. Through the print parameter editing screen, the supporting program 42 may receive only the specific parameters or may receive both the specific parameters and the general-use parameters.

Figure 3:
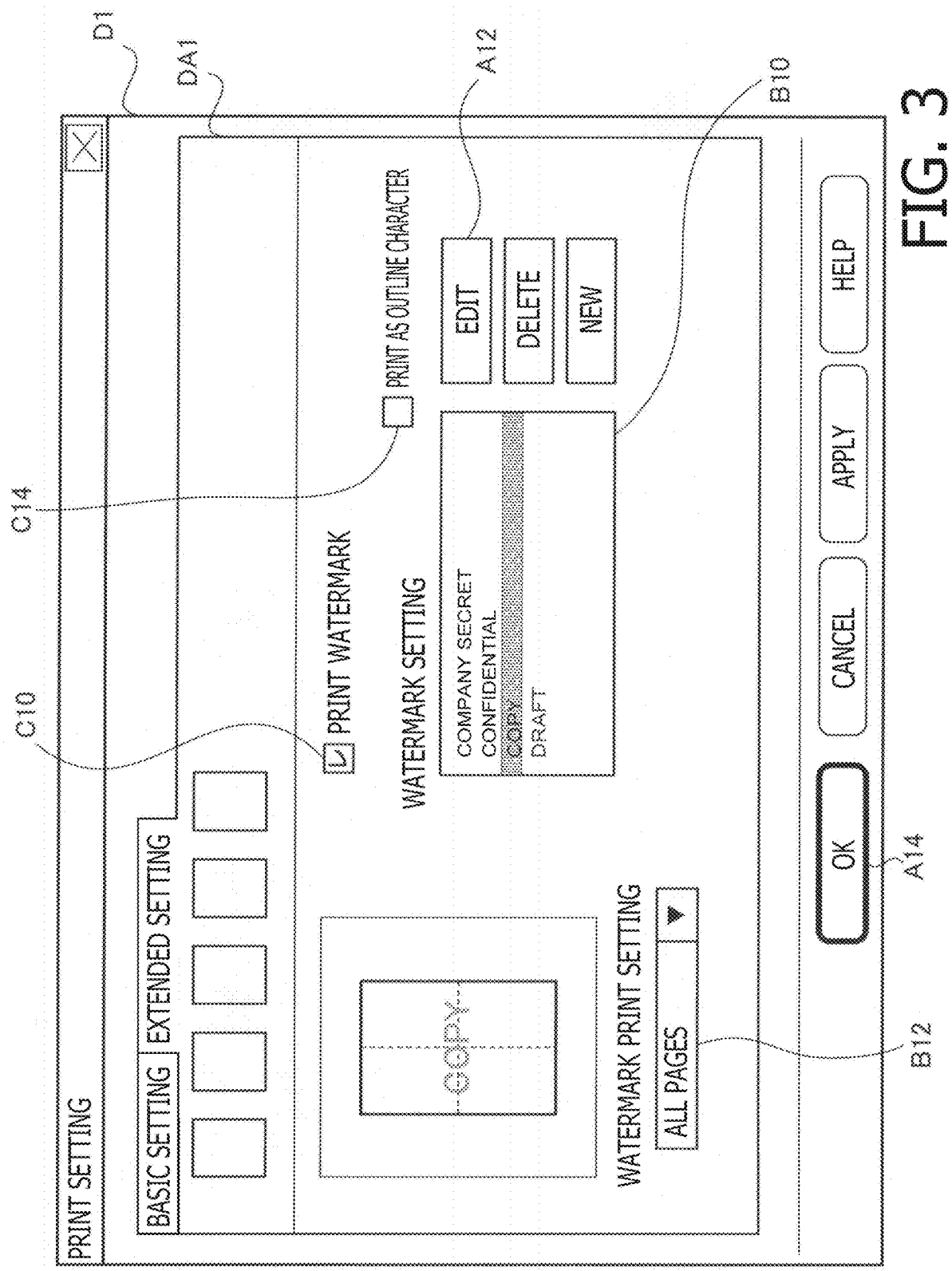
FIG. 3 is a diagram of a UI showing an example of a print parameter editing screen.

For example, as shown in FIG. 3, when the watermark is selected from extended functions displayed in a print parameter editing screen D1, the supporting program 42 causes the UI 20 to display a watermark setting screen DA1. To the watermark setting screen DA1, check boxes C10 and C14, a watermark selection box B10, a watermark setting box B12, an OK button A14 and an EDIT button A12 are provided.

When the check box C10 is not checked, a setting for not printing a watermark will be made, and when the check box C10 is checked, for example, as shown in FIGS. 4A-4D, a setting for printing a watermark G2 will be made. When the check box C14 is checked, a setting for printing the watermark G2 as outline characters is made. The outline character is a character that is printed by drawing an outline of the character without filling inside the character.

In the watermark selection box B10, watermarks that are registered in the supporting program 42 are displayed in a selectable manner. When the EDIT button A12 is operated, the supporting program 42 displays a watermark editing screen which is not shown in the drawings, and thus the user can edit a watermark selected in the watermark selection box B10 through the watermark editing screen. In the not-shown watermark editing screen, for example, contents, font, color, a position within an image subjected to be printed, size, tilt and a placing plane of a watermark can be set. Furthermore, in the not-shown watermark editing screen, the density of the watermark for printing can be set. The lower a setting value of the density, the paler the printed watermark. The watermark setting box B12 is a box for selecting pages on which the watermark is to be printed and, for example, when all the pages are selected, even when executing 2-in-1 printing (i.e., aggregation printing of printing two pages on one side of one sheet), one watermark G2 will be printed on each page as shown in FIG. 4D.

Figure 4:
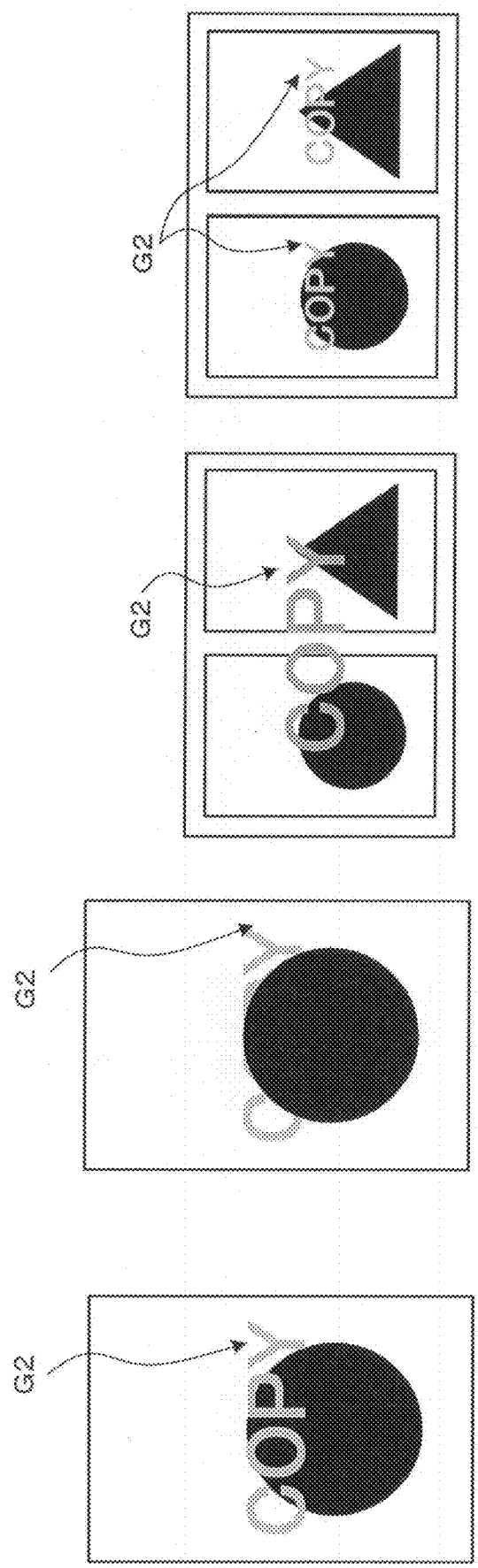
FIGS. 4A-4D are conceptual images showing examples of printed watermarks.

It is noted that, as shown in FIG. 4C, a setting for printing one watermark G2 on one sheet when executing the 2-in-1 printing is also possible. Furthermore, for example, when arranging a plurality of watermarks on one page, settings concerning the watermarks can be performed separately. The settings of a watermark are examples of a setting concerning image combining, and the watermark G2 is an example of a specific object.

When the OK button A14 is operated through the UI 20, the supporting program 42 receives print parameters that has been input through the UI 20 and stores the print parameters in the memory 12.

The settings of a watermark may include first settings to be used to add a watermark by changing contents of intermediate image data (e.g., changing contents of XPS-format intermediate image data), and second settings to be used to add a watermark in a manner different from the changing of contents of intermediate image data.

Specifically, for example, as shown in FIG. 4A, the first settings are a settings for printing the watermark G2 with standard characters. For example, the first settings include a setting value indicating "place the watermark on the foremost plane of an image subjected to be printed" in settings of the watermark placing plane, a setting values indicating "place standard characters" in settings for placing characters, and the remaining setting values concerning the standard characters (e.g., a position within an image subjected to be printed, size, tilt and font of the standard characters).

In order to arrange the watermark G2 for example as shown in FIG. 4B, the setting value of the watermark placing plane is set to "place the watermark on the rearmost plane of an image subjected to be printed" in place of "place the watermark on the foremost plane of an image subjected to be printed". Furthermore, for example, if images such as the logo indicating that confidential information is included are registered in a storage area that the general-use printing program 41 can use, settings concerning such images will be included in the first settings. In this case, the first settings include, for example, a setting value of the watermark placing plane, a setting value indicating that an image is to be placed, and the remaining setting values concerning the image (e.g., a position within an image subjected to be printed, size and tilt of the image and information indicating a place where the image is stored).

On the other hand, the second settings are, for example, settings which does not correspond to the examples of the first settings described above. For example, the second settings include settings for printing the watermark G2 shown in FIG. 4A in outline characters. In this case, the second settings include a setting value of the watermark placing plane, a setting value indicating "place outline characters" among settings indicating that characters are to be placed, and the remaining setting values concerning the outline characters (e.g., a position within an image subjected to be printed, size, tilt and font of the outline characters).

It is noted that the second settings may include a setting value indicating "place the watermark between specific layers of an image subjected to be printed" among settings of the watermark placing plane, for example, a setting for placing a watermark between the first layer and the second layer, and the remaining setting values when such setting value is set. When an image registered in a storage area for the supporting program 42 is used for a watermark, the second settings may include settings concerning the image.

Furthermore, for example, when placing the character string "COPY" in standard characters and the character string "COPY" in outline characters on the same page, print parameters of an image subjected to be printed include settings concerning the character string "COPY" in standard characters, that is, the first settings, and settings concerning the character string "COPY" in outline characters, that is, the second settings.

Referring back to FIG. 2, the supporting program 42 which received settings of the print parameters checks whether the received print parameters include settings concerning a watermark or not (arrow F). For example, the supporting program 42 determines that the received print parameters include settings of a watermark if, at the arrow E, operation of the OK button A14 has been received in a state where the check box C10 in the watermark setting screen DA1 is checked and the character string "COPY" in standard characters and the character string "COPY" in outline characters are designated as watermarks (arrow F). In this case, the supporting program 42 checks whether the first settings are included in the settings of the watermarks or not (arrow G). The process at the arrow G is an example of a determining process.

When the settings of the watermarks include the first settings, the supporting program 42 generates intermediate combined image data (arrow H). The intermediate combined image data is, for example, XPS format data. The process at the arrow H is an example of a generating process. For example, the supporting program 42 combines a watermark with the intermediate image data by generating a command based on the first settings in the XPS format and adding the command to the intermediate image data attached to the execution command (arrow H). Determining that the settings of a watermark include the first settings is an example of a case where it is determined that no specific condition is set.

For example, when the character string "COPY" in standard characters and the character string "COPY" in outline characters are designated as watermarks, with regard to the character string "COPY" in standard characters, for example, the setting value indicating "place the watermark on the foremost plane of an image subjected to be printed" among setting values of the watermark placing plane, the setting value indicating "place standard characters" among setting values indicating that characters are to be placed, and the remaining setting values concerning the standard characters (e.g., a position of the standard characters within an image subjected to be printed, size, tilt and font of the standard characters) are set in the print parameters. And, with regard to the character string "COPY" in outline characters, for example, the setting value indicating "place the watermark on the foremost plane of an image subjected to be printed" among setting values of the watermark placing plane, the setting indicating "place outline characters" among setting values indicating that characters are to be placed, and the remaining settings concerning the outline characters (e.g., a position of the outline characters within an image subjected to be printed, size, inclination and font of the outline characters) are set in the print parameters. The settings of the character string "COPY" in standard characters correspond to the first settings, and the settings of the character string "COPY" in outline characters correspond to the second settings.

In this case, the supporting program 42 generates intermediate image data for the character string "COPY" in standard characters which is the first settings. That is, the supporting program 42 generates an XPS command indicating "place the watermark on the foremost plane of an image subjected to be printed" and adds the XPS command to the intermediate image data in XPS format. Then, the supporting program 42 generates an XPS command indicating the character string "COPY" to be placed, an XPS command indicating a position, in an image subjected to be printed, where the character string is to be placed, and XPS commands indicating size, tilt and font of the character string, and adds these XPS commands to the intermediate image data in XPS format. An image of the character string "COPY" in standard characters is thereby combined with the intermediate image data. The intermediate image data to which the XPS commands are added is the intermediate combined image data.

It is noted that, when, for example, an image registered in the storage area that the general-use printing program 41 can use is set as a watermark, settings concerning the image correspond to the first settings. In this case, the supporting program 42 generates XPS commands indicating the setting values concerning the image to be placed (i.e., a path to an image file of the image), a position of the image within an image subjected to be printed and size and tilt of the image, and adds these XPS commands to the intermediate image data in XPS format.

It is noted that, since the settings of the character string "COPY" in outline characters do not correspond to the first settings, the process at the arrow H is not executed for the character string "COPY" in outline characters. That is, intermediate combined image data for a watermark in outline characters will not be generated at the arrow H.

Upon generating the intermediate combined image data, the supporting program 42 outputs an end notification (arrow I). In response to receipt of the end notification, the general-use printing program 41 generates print data (arrow J). The intermediate combined image data is attached to the end notification, and the general-use printing program 41 generates print data based on the intermediate combined image data. The print data is, for example, raster image data in bitmap format. The print data generated at the arrow J based on the intermediate combined image data is an example of second image data.

The general-use printing program 41 which generated the print data outputs an execution command (arrow K). The execution command includes the print data, which the general-use printing program 41 has generated based on the intermediate combined image data, and print parameters. The print parameters include settings that has not been processed at the arrow H, that is, the second settings. Specifically, the settings of the character string "COPY" in outline characters are included.

The supporting program 42 can obtain the print data from the execution command (arrow L). The process at the arrow L is an example of an obtaining process. The print data obtained at the arrow L is an example of the second image data. The supporting program 42 which obtained the print data checks whether the print parameters attached to the print data include settings of a watermark or not (arrow M). If settings of a watermark are included in the print parameter, the supporting program 42 determines whether the settings of a watermark include the second settings (arrow N). The process at the arrow N is an example of the determining process. Determining that the settings of a watermark include the second settings is an example of determining that a specific condition is set. If the settings of a watermark include the second settings, the supporting program 42 generates combined data based on the second settings. The combined data is raster image data of an image indicating a watermark (arrow O). The process at the arrow O is an example of the generating process. The supporting program 42 generates combined image data by combining the combined data with the print data (arrow P). The process at the arrow P is an example of the combining process. The combined data is an example of specific data and first image data.

Figure 5:
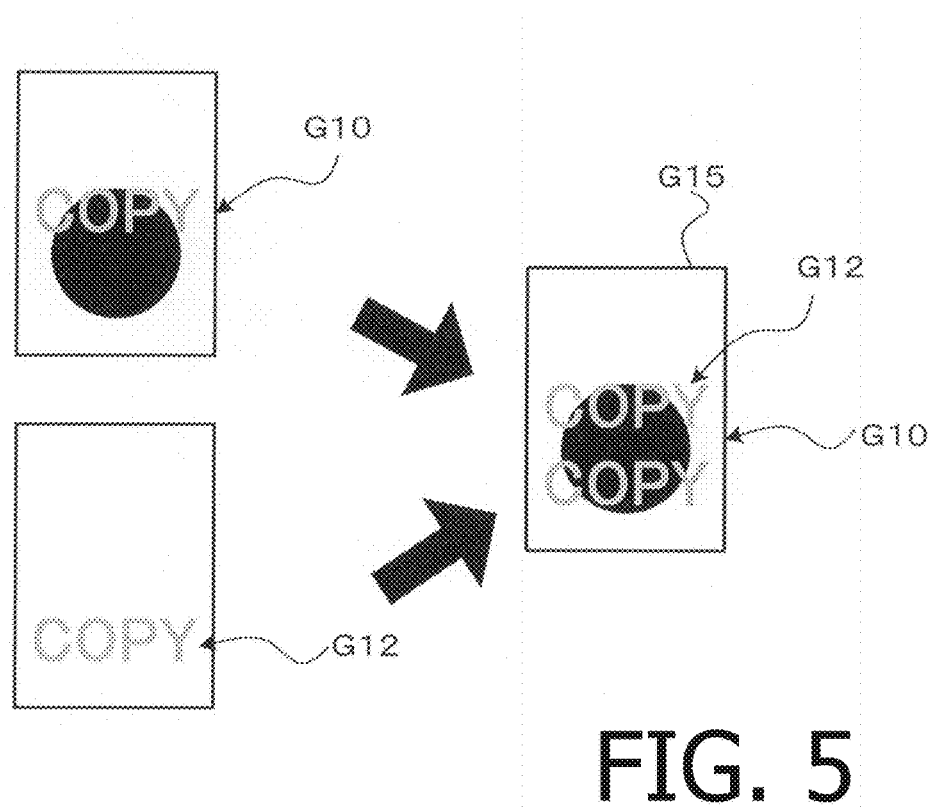
FIG. 5 is a diagram showing a concept of a process for combining images.

When the character string "COPY" in standard characters and the character string "COPY" in outline characters are designated as watermarks as described above, for example, the supporting program 42 obtains raster image data of an image G10 shown in FIG. 5 including the character string "COPY" in standard characters and an image subjected to be printed from the general-use printing program 41 (arrow M). The print data includes the settings concerning the character string "COPY" in outline characters which have not been processed at the arrow H, that is, the second settings. In this case, the supporting program 42 obtains, from among pieces of font image data indicated by font settings, font image data to be used for the character string "COPY" and processes the obtained font image data to generate outline character image data of an image G12 including the character string "COPY" in outline characters (arrow O). Then, the supporting program 42 generates image data of a combined image G15 by combining the outline character image data of the image G12 with the raster image data of the image G10 in accordance with the settings of the character string "COPY" in outline characters, for example, the setting value indicating "place the watermark on the foremost plane of an image subjected to be printed" and the setting values concerning a position of the outline characters within an image subjected to be printed, size and tilt of the character string in outline characters (arrow P).

It is noted that, for example, the setting value indicating "place the watermark between specific layers of an image subjected to be printed" among setting values of the watermark placing plane and the remaining setting values when the above setting value is set correspond to the second settings. When such second settings are included in the print parameter, the supporting program 42 obtains, from among pieces of font image data indicated by font settings, font image data to be used for the character string (arrow O). In this case, a process for processing characters into outline characters may be executed as necessary. Then, the supporting program 42 combines the font image data with the print data in accordance with the setting value indicating "place the watermark between specific layers of an image subjected to be printed" and the setting values of a position of the character string within an image subjected to be printed, size and tilt of the character string (arrow P). It is noted that the character string may be an image.

The supporting program 42 which generates the combined image data outputs an end notification (arrow Q). In response to receipt of the end notification, the general-use printing program 41 outputs a print command to the printer 2 (arrow R). When, for example, the character string "COPY in standard characters and the character string "COPY" in outline characters are designated as watermarks and the processes at the arrows H, O and P has been executed as described above, the general-use printing program 41 outputs the print command while attaching, to the print command, the print data corresponding to the character string "COPY" in standard characters which has been generated by the processes at the arrows H and I and the combined image data corresponding to the character string "COPY" in outline characters which has been generated by the processes at the arrows O and P.

It is noted that, when an operation of the OK button A14 is received in a state where the check box C10 in the watermark setting screen DA1 is not checked, the supporting program 42 edits the intermediate image data and/or the print data attached to the execution command in accordance with the print parameters and outputs the print data to the printer 2. That is, the supporting program 42 does not execute the processes at the arrows G, H and N-P.

As described above, when executing printing by using the general-use printing program 41, the supporting program 42 of the present embodiment receives the settings of image combining for combining a watermark with an image subjected to printing. When the settings of the image combining are received, the supporting program 42 generates the specific data for executing the image combining. Therefore, according to the present supporting program 42, even when executing printing by using the general-use printing program 41, it is possible to execute the image combining which is a function that is intrinsic to the printer 2 or the supporting program 42.

In the above description, a case where the print parameters include both the first settings and the second settings has been described. However, when the settings of a watermark include only the first settings, the processes at the arrows K-Q may be omitted and, after generating print data at the arrow J, the generated print data may be transmitted to the printer 2 at the arrow R. In that case, the print data generated in arrow J is an example of the third image data. Also, when, for example, the settings concerning a watermark only include the second settings, the process at the arrow H may be omitted and combined image data generated at the arrows O and P may be transmitted to the printer 2 as print data.

If, for example, the supporting program 42 has a function of, for example at the arrow H, generating an image file indicating an image corresponding to the second settings (for example, an image of outline characters), and registering the image file in the storage area that the general-use printing program 41 can use, the settings of the outline characters may be handled as the first settings. In this case, when generating the intermediate combined image data, the supporting program 42 generates an XPS command including a path to an image file indicating the image of the outline characters and adds the XPS command to the intermediate combined image data. The general-use printing program 41 obtains the image of the outline characters in accordance with the path to the image file and generates print data.

Second Embodiment

Next, the second embodiment of the present disclosure will be described. The present embodiment differs from the first embodiment in that the supporting program 42 transmits a command to the general-use printing program 41 in accordance with the settings of a watermark. A process for combining a watermark with an image subjected to printing will be described with reference to a sequential chart shown in FIG. 6. It is noted that, among processes shown in FIG. 6, processes that are common to those shown in FIG. 2 are assigned the same numerals as those used in FIG. 2 and descriptions thereof are appropriately omitted. In the second embodiment, the supporting program 42 does not execute processes for combining a watermark with an image subjected to printing prior to generating print data, that is, the processes at the arrows F-H shown in FIG. 2.

There are printers which have a function of adding a watermark. A flag is set to printer information stored in the memory 12 if a printer corresponding to the printer information has the function of adding a watermark.

Upon obtaining the print data generated by the general-use printing program 41 (arrow L), the supporting program 42 determines whether settings of a watermark are included in the print parameters (arrow M). Then, if settings of a watermark are included in the print parameters, the supporting program 42 checks whether the printer 2 has the function of adding a watermark or not (arrow U). That is, the supporting program 42 determines whether a flag is set to the printer information of the printer 2.

If the flag is set to the printer information of the printer 2, the supporting program 42 determines that the printer 2 has the function of adding a watermark and generates a command for combining the watermark with the print data (arrow V). That is, the supporting program 42 generates a command that is similar to the command to be generated by the process at the arrow H of the first embodiment. The supporting program 42 further generates a command corresponding to the second settings which are to be used in the process at the arrow O of the first embodiment. Then, the supporting program 42 adds the generated command to the print data (arrow W) and outputs an end notification (arrow X). The general-use printing program 41 outputs the print data to which the command is added to the printer 2 (arrow Y). The printer 2 prints the print data in accordance with the command That is, the printer 2 combines the watermark with an image subjected to printing by itself and executes printing. In accordance with the command, the printer 2 generates print data with a process similar to that at the arrow J of the first embodiment or generates combined data and combines the combined data with the print data generated by the general-use printing program 41 with processes similar to those at the arrows O and P of the first embodiment. That is, similarly to the first embodiment, the printer 2 can print an image with which the watermark is combined. It is noted that the print data transmitted in the arrow Y is an example of the before-combined image data.

If no flag is set to the printer information of the printer 2, the supporting program 42 determines that the printer 2 does not have the function of adding a watermark, executes the processes at the arrows M-P described above and transmit the combined image data to the printer 2. In this case, the supporting program 42 executes the processes at the arrows O and P even when the settings indicated by the print parameters include the first settings. That is, if the printer 2 does not have the function of adding a watermark, regardless of whether a watermark includes outline characters or not, the supporting program 42 generates combined data and combines the combined data with the print data.

According to the present embodiment, since the printer 2 combines the watermark with the image subjected to printing in accordance with the command, it is possible to realize the image combining even if the print instruction is an instruction to execute printing using the general-use printing program 41. For example, there is a case where the general-use printing program 41 and the supporting program 42 cannot edit, in the XPS format, watermarks of special fonts and special images which are supported by the printer 2, that is, preset objects. In such a case, by configuring to transmit a command to the printer 2 to cause the printer 2 to combine the preset objects with the image subjected to printing, it becomes possible to combine watermarks that cannot be edited in the XPS format with an image subjected to printing in the printer 2.

It is noted that the present embodiments are only illustrative examples and is not intended to limit aspects of the present disclosures. Accordingly, the present disclosure can be modified or enhanced without departing from aspects of the disclosures. For example, the device connected to the PC 1 need not be limited to the printer but may be any device which has a printing function (e.g., an MFP, a copier, a facsimile machine and the like). Further, the number of printers connected to the PC 1 need not be limited to that in the illustrated example but may be one or three or more.

A module that executes respective processes of the present embodiments is not limited to the supporting program 42. For example, the module only needs to be a program that receives an instruction from the OS 21 when executing printing using the general-use printing program 41 of the OS 21. For example, the module may be Print workflow of which specification is disclosed by Microsoft.

Figure 2:
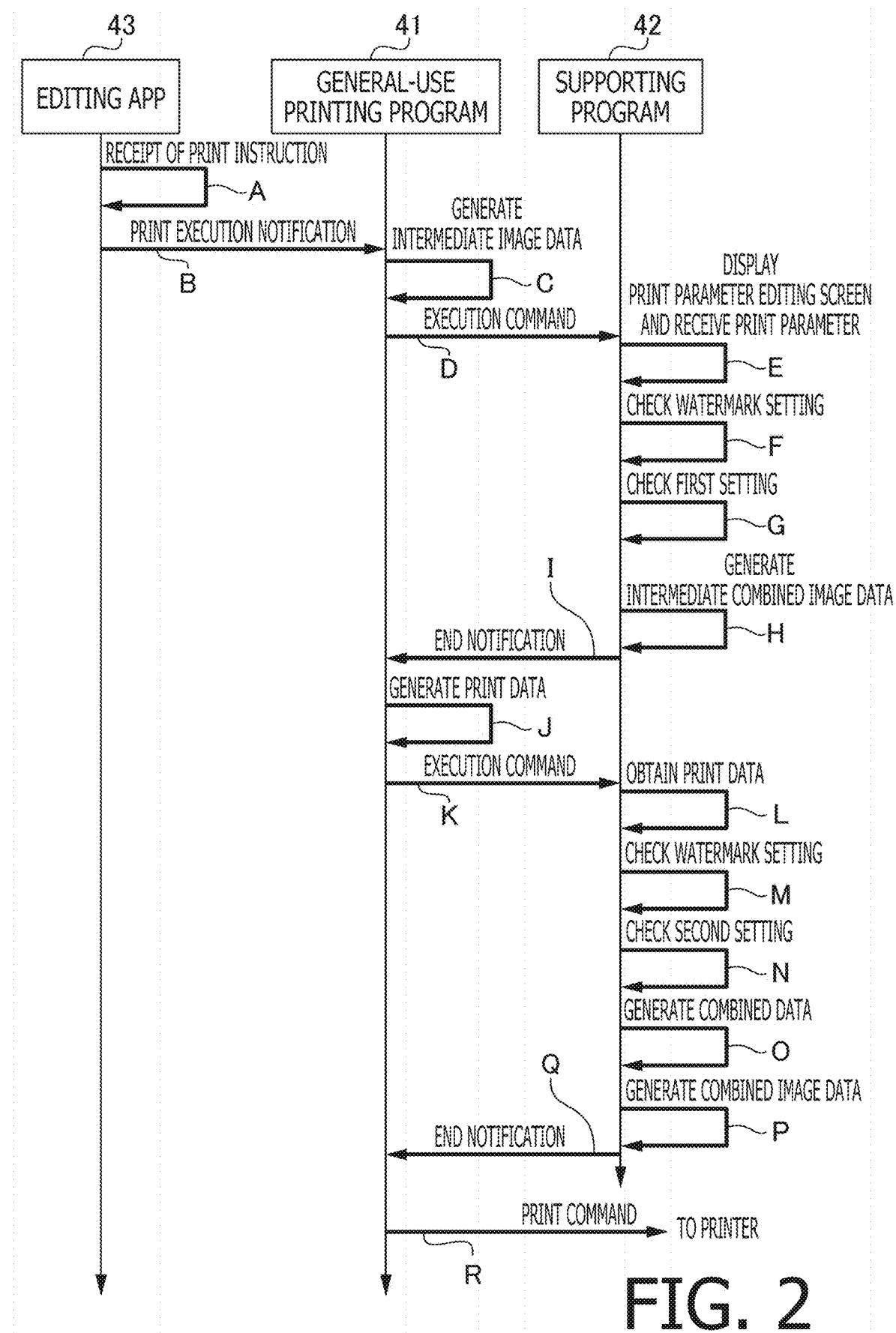
FIG. 2 is a sequential chart showing an example an order of operations by respective programs.

All the combining processes for a watermark may be executed in the processes at the arrows P and Q without executing the processes at the arrows H and I shown in FIG. 2. According to this configuration, as with the above-described embodiments, even if the print instruction is an instruction to the general-use printing program 41, a watermark can be combined with an image. However, it may takes time to combine raster image data of the watermark with raster image data of the image subjected to printing. In contrast, as in the above-described embodiments, by executing the processes at the arrows H and I shown in FIG. 2 when a watermark is to be combined as standard characters and by executing the processes at the arrows P and Q when a watermark is to be combined as outline characters, processes concerning the combining of a watermark can be completed faster.

In the above embodiments, combining of a watermark is given as an example of combining printing for convenience sake. In place of a watermark, other combining printing may be executed similarly to the above-described processes. For example, the present print system may be used in a ground tint printing in which an image such as a company logo is printed as ground tint by receiving a setting for placing the image at a plurality of positions on a rearmost plane of an image subjected to printing while lowering density of the image.

Figure 6:
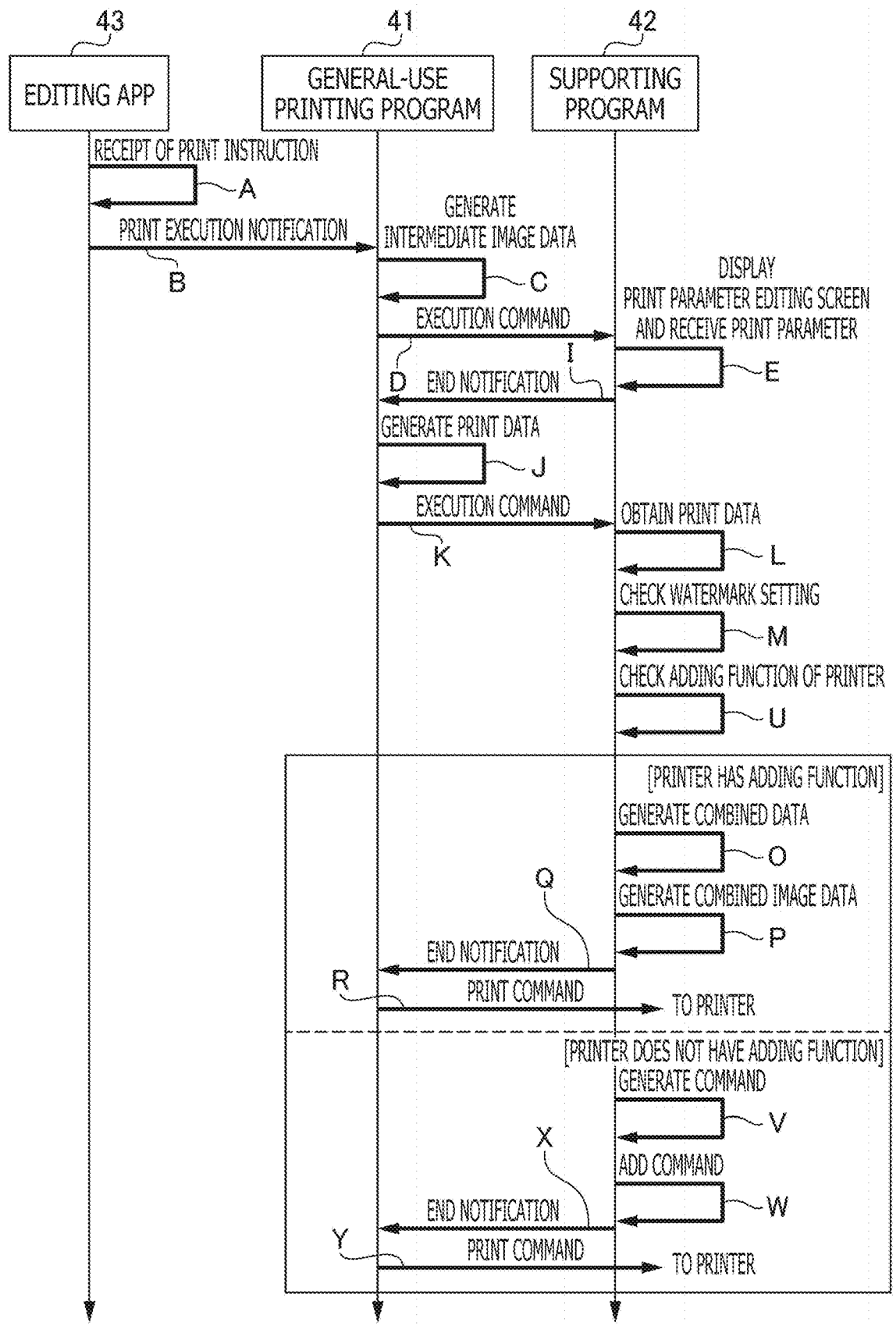
FIG. 6 is a sequential chart showing an example of an order of operations by respective programs in the second embodiment.

The print system may be configured such that, when the settings of the watermark include only the first settings, that is, when the settings of the watermark does not include the second settings, the processes at the arrows G-I shown in FIG. 2 are executed after the process at the arrow F, and when the settings of the watermark includes the second settings, the processes at the arrows U, O-R and V-Y shown in FIG. 6 are executed. The settings of the watermark including the second settings is an example of the specific condition. The print data generated by the general-use printing program 41 after processes of the arrow G-I is an example of after-combined image data. There are watermarks which take time to be combined with an image through the combining process by the printer 2. Even in this case, printing can be completed faster by combining the watermarks using the supporting program 42 when the supporting program 42 can execute the combining process.

In FIGS. 2 and 6, the combining processes by the supporting program 42 are described. However, the supporting program 42 may execute processes other than the combining processes, such as edition of the intermediate image data and edition of the print data.

A receiving method of the print parameter has a plurality of variations other than the above-described embodiments. The print parameters input through the editing APP 43 may be received by transmitting to the supporting program 42 via the general-use printing program 41. The supporting program 42 may obtain the print parameters included in the execution command received at the arrow D and may execute the determining process at the arrows G and N. The supporting program 42 may obtain the print parameters included in the execution command received at the arrow K and may execute the determining process at the arrow N. For example, after obtaining the print data at the arrow L, the supporting program 42 may receive settings of the print parameters through a process similar to that at the arrow E, that is, the supporting program may cause the UI 20 to display the print parameter editing screen and receive settings of the print parameters, and may execute the determining process at the arrow N for the received settings of the print parameters. The process at the arrow E may be executed after obtaining the print data at the arrow L.

In any of the sequential charts disclosed in the embodiment, the order of multiple processes at arbitrary multiple steps may be changed arbitrarily or may be executed in parallel unless there occurs conflicts in processing contents.

The processes disclosed in the present embodiment may be executed by a single CPU, a plurality of CPU's, hardware such as an ASIC or a combination thereof. Further, the processes disclosed in the present embodiment may be realized by various modes such as a non-transitory recording medium storing programs for executing the processes, methods for executing the processes and the like.

What is claimed is:

1. A non-transitory computer-readable recording medium for an information processing apparatus, the information processing apparatus having a controller, the recording medium containing computer-executable programs realizing a supporting program corresponding to a printer connectable to the information processing apparatus, the supporting program causing, when executed by the controller, the information processing apparatus to perform:

a receiving process when a print instruction is input to a general-use printing program, the print instruction causing the printer to execute printing of an image, the general-use printing program being a program implemented in an operating system of the information processing apparatus, the receiving process being a process of receiving a print parameter of printing corresponding to the print instruction, the print parameter including a setting of editing of a target image based on a specific object, the target image being an image subjected to printing based on the print instruction; and a generating process of generating specific data to be edited with generated data, the generated data being data generated by the general-use printing program based on the target image, the target image being an image subjected to printing when the setting of the editing is received in the receiving process.

2. The non-transitory computer-readable recording medium according to claim 1, wherein, in the generating process, based on the setting of the editing received in the receiving process, first image data is generated as the specific data, the first image data being raster image data of the specific object, wherein the supporting program causes, when executed by the controller, causes the information processing apparatus to perform:

an obtaining process of obtaining second image data being raster image data generated by the general-use printing program based on image data indicating the target image subjected to printing based on the print instruction; and an editing process of generating edited image data based on the first image data generated in the generating process and the second image data obtained in the obtaining process, and wherein the general-use printing program transmits the edited image data generated in the editing process to the printer.

3. The non-transitory computer-readable recording medium according to claim 2, wherein the editing process is a process of generating combined image data as the edited image data, the combined image data being image data in which the first image data generated in the generating process and the second image data obtained in the obtaining process are combined.

4. The non-transitory computer-readable recording medium according to claim 2, wherein the supporting program causes, when executed by the controller, causes the information processing apparatus to perform:

a determining process of determining whether a specific condition is set as a setting of the editing received in the receiving process, when it is determined that the specific condition is set:
generating the first image data as the specific data in the generating process;
the obtaining process; and
the editing process, when it is determined that the specific condition is not set, generating intermediate edited image data as the specific data in the generating process, the intermediate edited image data being data indicating an image the target image subjected to printing is edited with using the specific object based on the print instruction, the general-use printing program generating third image data being raster data based on the intermediate edited image data, and transmitting the third image data to the printer.

5. The non-transitory computer-readable recording medium according to claim 4, wherein the setting of the editing to be received by the receiving process includes a first setting and a second setting, the first setting being a setting which corresponds to a data format of the intermediate edited image data, the second setting being a setting which does not correspond to the data format of the intermediate edited image data, and wherein, when the setting of the editing received in the receiving process includes the second setting, it is determined in the determining process that the specific condition is set.

6. The non-transitory computer-readable recording medium according to claim 5, wherein the specific object is a character string, and wherein the second setting is a setting of processing the character string of the specific object into outline character.

7. The non-transitory computer-readable recording medium according to claim 1, wherein, in the generating process, the supporting program causes, when executed by the controller, causes the information processing apparatus to perform generating a command to edit the target image subjected to printing with using the specific object based on the print instruction and generating print data as the specific data, the print data being data in which the command is attached to before-edited image data, the before-edited image data being raster image data generated by the general-use printing program, the general-use printing program transmitting the print data generated in the generating process to the printer, the printer having a function of generating edited image data indicating an edited image a before-edited image is edited with using the specific object based on the command attached to the print instruction.

8. The non-transitory computer-readable recording medium according to claim 7, wherein the supporting program causes, when executed by the controller, causes the information processing apparatus to perform:

a determining process of determining whether a specific condition is set as a setting of the editing received in the receiving process, when it is determined that the specific condition is set, generating the print data as the specific data in the generating process, the print data being data in which the command is attached to before-edited image data, the before-edited image data being raster image data generated by the general-use printing program, the general-use printing program transmitting the print data generated in the generating process to the printer;

when it is determined that the specific condition is not set, generating intermediate edited image data as the specific data in the generating process, the intermediate edited image data indicating an image in which the target image subjected to printing is edited with using the specific object based on the print instruction, the general-use printing program generating after-edited image data and transmitting the after-edited image data to the printer, the after-edited image data being raster image data based on the intermediate edited image data.

9. The non-transitory computer-readable recording medium according to claim 8, wherein the setting of the editing to be received by the receiving process includes a first setting and a second setting, the first setting being a setting which corresponds to a data format of the intermediate edited image data, the second setting being a setting which does not correspond to the data format of the intermediate edited image data, and wherein, when the setting of the editing received in the receiving process includes the second setting, it is determined, in the determining process, that the specific condition is set.

10. The non-transitory computer-readable recording medium according to claim 9, wherein the second setting is a setting of using a preset object stored in the printer in advance as the specific object.

11. An information processing apparatus having a controller, wherein a general-use printing program is implemented in an operating system of the information processing apparatus, wherein a supporting program is implemented in the information processing apparatus, the supporting program corresponding to a printer connectable to the information processing apparatus, wherein the controller performs:

a receiving process when a print instruction is input to a general-use printing program, the print instruction causing the printer to execute printing of an image, the general-use printing program being a program implemented in an operating system of the information processing apparatus, the receiving process being a process of receiving a print parameter of printing corresponding to the print instruction, the print parameter including a setting of editing of a target image based on a specific object, the target image being an image subjected to printing based on the print instruction; and a generating process of generating specific data to be edited with generated data, the generated data being data generated by the general-use printing program based on the target image, the target image being an image subjected to printing when the setting of the editing is received in the receiving process.

12. A printing method of controlling an information processing apparatus having a controller, wherein a general-use printing program is implemented in an operating system of the information processing apparatus, wherein a supporting program is implemented in the information processing apparatus, the supporting program corresponding to a printer connectable to the information processing apparatus, wherein the method includes:

when a print instruction is input to a general-use printing program, receiving a print parameter of printing corresponding to the print instruction, the print instruction causing the printer to execute printing of an image, the general-use printing program being a program implemented in an operating system of the information processing apparatus, the print parameter including a setting of editing of a target image based on a specific object with, the target image being an image subjected to printing based on the print instruction; and generating specific data to be edited with generated data, the generated data being data generated by the general-use printing program based on the target image, the target image being an image subjected to printing when the setting of the editing is received.

* * * * *

UNITED STATES PATENT AND TRADEMARK OFFICE
CERTIFICATE OF CORRECTION

PATENT NO. : 11,609,727 B2
APPLICATION NO. : 17/219966
DATED : March 21, 2023
INVENTOR(S) : Yoshito Hosomizo It is certified that error appears in the above-identified patent and that said Letters Patent is hereby corrected as shown below:

On the Title Page

Item (56) References Cited, Foreign Patent Documents should read:
2017/0223210 A1 8/2017 Yamada Signed and Sealed this
Twenty-third Day of May, 2023

Katherine Kelly Vidal
Director of the United States Patent and Trademark Office